United States Patent
Gallant et al.

(10) Patent No.: US 9,032,427 B2
(45) Date of Patent: *May 12, 2015

(54) SYSTEM FOR MONITORING A VIDEO NETWORK AND METHODS FOR USE THEREWITH

(75) Inventors: Michael Gallant, Kitchener (CA); Michael Archer, Cambridge (CA); Kevin Goertz, Waterloo (CA); Anthony Peter Joch, Waterloo (CA); Roman Kordasiewicz, Elmira (CA)

(73) Assignee: Avvasi Inc., Waterloo (CA)

( * ) Notice: Subject to any disclaimer, the term of this patent is extended or adjusted under 35 U.S.C. 154(b) by 37 days.

This patent is subject to a terminal disclaimer.

(21) Appl. No.: 13/191,629

(22) Filed: Jul. 27, 2011

(65) Prior Publication Data

US 2013/0031575 A1 Jan. 31, 2013

Related U.S. Application Data

(63) Continuation-in-part of application No. 13/053,650, filed on Mar. 22, 2011, and a continuation-in-part of application No. 13/053,565, filed on Mar. 22, 2011, now Pat. No. 8,599,684.

(60) Provisional application No. 61/407,527, filed on Oct. 28, 2010, provisional application No. 61/407,531, filed on Oct. 28, 2010.

(51) Int. Cl.
*H04H 60/33* (2008.01)
*H04W 24/00* (2009.01)
*H04N 21/442* (2011.01)
*H04W 24/08* (2009.01)

(52) U.S. Cl.
CPC .......... *H04W 24/00* (2013.01); *H04N 21/44209* (2013.01); *H04W 24/08* (2013.01)

(58) Field of Classification Search
CPC .......... H04N 21/238; H04N 21/23805; H04N 21/44209; H04N 21/44245
USPC ....................................... 725/9–21
See application file for complete search history.

(56) References Cited

U.S. PATENT DOCUMENTS

| | | | |
|---|---|---|---|
| 2005/0063377 A1 | 3/2005 | Bryant et al. | |
| 2006/0034185 A1* | 2/2006 | Patzschke et al. | 370/252 |
| 2007/0220575 A1* | 9/2007 | Cooper et al. | 725/118 |
| 2007/0245372 A1 | 10/2007 | Yasuda | |
| 2007/0261073 A1 | 11/2007 | Blumenschien et al. | |

(Continued)

OTHER PUBLICATIONS

Tan, Xiangchun. et al. ("Perceived Video Streaming Quality under Initial Buffering and Rebuffering Degradations" MESAQIN Jun. 5, 2006).*

(Continued)

*Primary Examiner* — Junior Mendoza
(74) *Attorney, Agent, or Firm* — Garlick & Markison; Bruce E. Stuckman

(57) ABSTRACT

A monitoring system includes a video network analyzer processes the packet data to generate network and media session data relating to the distribution of video content via the data distribution network in at least one media session, wherein the network and media session data includes at least one session metric, location data, protocol identification data, video encoding parameter data, and audio encoding parameter data. An analytics database stores the network and media session data for generation of report data.

20 Claims, 7 Drawing Sheets

(56) References Cited

U.S. PATENT DOCUMENTS

| | | | |
|---|---|---|---|
| 2007/0271590 A1* | 11/2007 | Gulas et al. | 725/118 |
| 2008/0002595 A1 | 1/2008 | Rao | |
| 2008/0250448 A1* | 10/2008 | Rowe et al. | 725/32 |
| 2009/0210892 A1* | 8/2009 | Ramaswamy | 725/9 |
| 2010/0008241 A1* | 1/2010 | Gustafsson et al. | 370/252 |
| 2010/0268834 A1* | 10/2010 | Eidelman et al. | 709/230 |
| 2010/0273558 A1* | 10/2010 | Gustafsson et al. | 463/42 |
| 2011/0194449 A1* | 8/2011 | Connor | 370/252 |
| 2011/0265109 A1* | 10/2011 | Goyet et al. | 725/9 |
| 2011/0271309 A1* | 11/2011 | Chetlur et al. | 725/91 |
| 2013/0041998 A1* | 2/2013 | Kordasiewicz et al. | 709/224 |

OTHER PUBLICATIONS

Gustafsson et al. ("Non-intrusive bitstream model for the assessment of performance of video streaming"; Sep. 17, 2010).*

International Search Report and Written Opinion of the International Searching Authority; PCT Application No. PCT/CA2011/001191; Feb. 8, 2012; 8 pages.

Batteram et al.; Delivering Quality of Experience in Multimedia Networks; Bell Labs Technical Journal; Jun. 1, 2010; pp. 175-193; vol. 15, No. 1.

Yamagishi, et al.; Non-instrusive Packet-Layer Model for Monitoring Video Quality of IPTV Services; IEICE Transactions on Fundamentals of Electronics, Communications and Computer Sciences; Dec. 1, 2009; pp. 3297-3306; vol. E92A, No. 12; Engineering Sciences Society, Tokyo, JP.

Gustafsson Ericsson Research et al.; P.NBAMS toR; 379 (GEN/12); ITU-T Draft; Study Period 2009-2012; Sep. 17, 2010; pp. 1-19; vol. 14/12.

Menkovski et al.; Measuring Quality of Experience on a Commercial Mobile TV Platform; IEEE; 2010 Second International Conferences on Advances in Multimedia; Jun. 13, 2013; pp. 33-38.

Cuadra-Sanchez; End-to-End Quality of Service Monitoring in Convergent IPTV Platforms; IEEE; Third International Conference on Next Generation Mobile Applications, Services and Technologies; Sep. 15, 2009; pp. 303-308.

European Patent Office; European Search Report; EP Application No. 11835390.3; Jun. 18, 2014; 6 pgs.

* cited by examiner

US 9,032,427 B2

SYSTEM FOR MONITORING A VIDEO NETWORK AND METHODS FOR USE THEREWITH

CROSS REFERENCE TO RELATED PATENTS

This application claims priority under 35 USC §120 as a continuation in part of the copending applications:
DEVICE WITH VIDEO BUFFER MODELING AND METHODS FOR USE THEREWITH, having Ser. No. 13/053,650, filed on Mar. 22, 2011;
CONGESTION ESTIMATION, having Ser. No. 13/053,565, filed on Mar. 22, 2011;
This application further claims priority under 35 USC §119 to Provisional Application No. 61/407,531, filed Oct. 28, 2010 and Provisional Application No. 61/407,527, filed Oct. 28, 2010, the contents of all which are hereby incorporated by reference in their entirety.

TECHNICAL FIELD OF THE INVENTION

The present invention relates to network monitoring and particularly in conjunction with video distribution in mobile networks and other networks.

DESCRIPTION OF RELATED ART

Conventional cellular networks are a complex system of various network components. Each component handles a specific set of protocols and services multiple clients. Even a moderately sized cellular network will have a large number of towers distributed geographically to provide a radio link between the core network and a number of client devices. Eventually, network traffic from the client devices travels through a small number of links that connect the core network of a provider to the larger Internet.

Due to the growing demands of mobile users, modern cellular networks service an increasingly large amount of bandwidth. Video services, geared to real-time entertainment, are becoming more and more popular and contribute significantly to the amount of traffic on many networks. Every network component must be sufficiently equipped to support the bandwidth demands. Otherwise, client experience is degraded and network performance suffers. Network managers are faced with challenges in analyzing network performance under various conditions to meet the needs of consumers that grow to expect greater performance.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
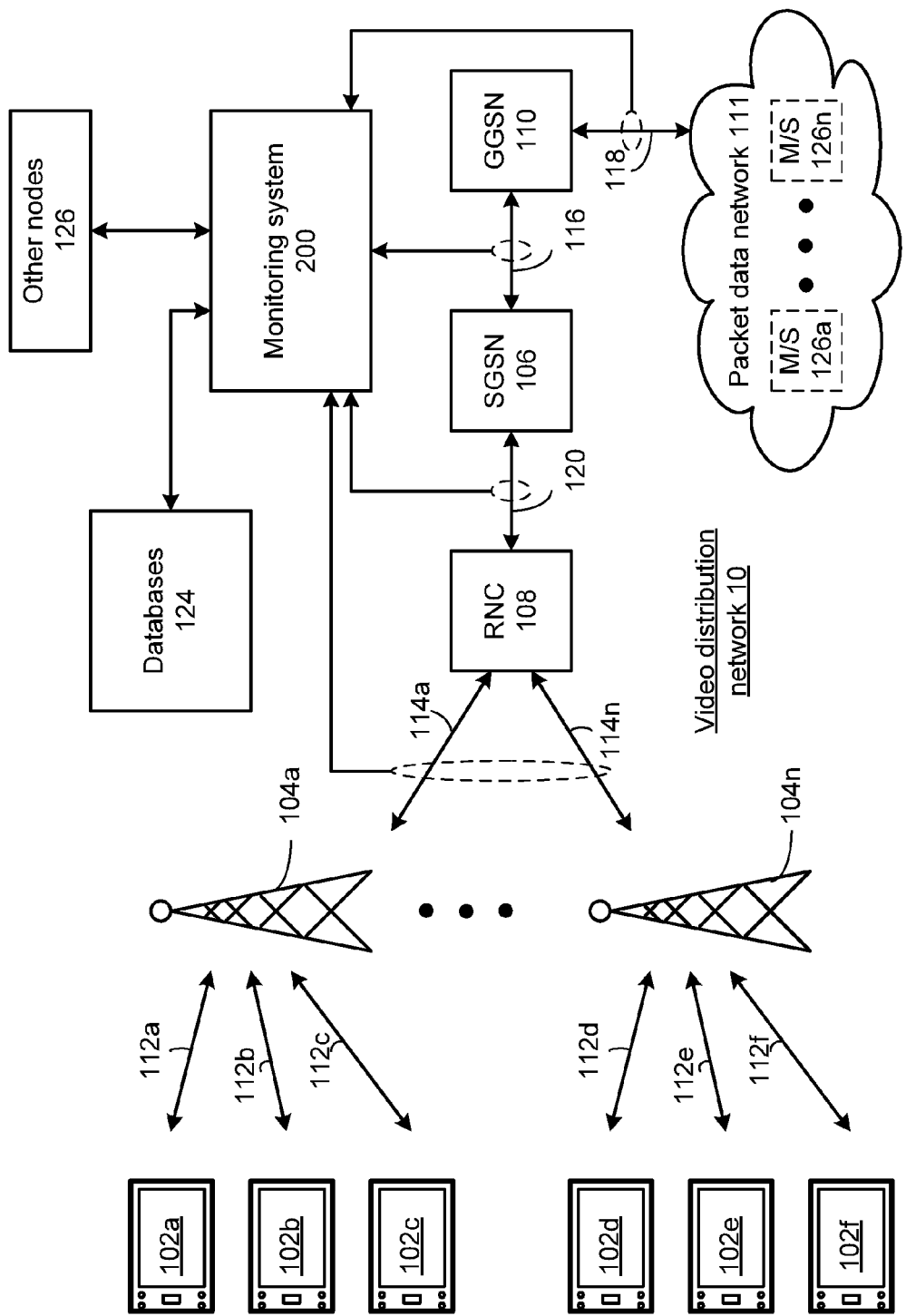
FIG. 1 presents a pictorial representation of data distribution network 10 in accordance with an embodiment of the present invention.

FIG. 1 presents a pictorial representation of data distribution network 10 in accordance with an embodiment of the present invention. The data distribution network 10 includes a number of user devices 102a-102f, a number of access devices 104a-104n, a Radio Network Controller (RNC) 108, a Service Gateway Support Node (SGSN) 106, a monitoring system 200, and a Gateway General Support Node (GGSN) 110. As shown the monitoring system 200 is coupled to one or more databases 124 and optionally to one or more other nodes 126 of the data distribution network 10 or other networks. The user devices 102a-102f may be implemented as cellular phones, smart phones, Personal Digital Assistants (PDAs) or other user devices capable of media processing distribution or playback. In the example shown, the data distribution network 10 includes a Universal Terrestrial Radio Access Network (UTRAN) that connects to a packet data network 111 such as the Internet or other wide area network that includes one or more servers 126a-126n that are capable of supplying media content, such as streaming video or other media to the client devices 102a-102f. In this instance, the access devices 104a-104n are implemented via NodeB base stations. However, other access devices 104a-104n such as access points, home gateways, or other wired or wireless access devices may be implemented to meet the design criteria of a particular implementation.

Each of the user devices 102a-102n may present one or more data packets through one or more links 112a-112f to one or more of the access devices 104a-104n. The data packets from the user devices 102a-102f may be received as flows (or data flows) by one or more of the access devices 104a-104n. A flow may be considered a conversation between any two devices on a network such as client devices 102a-102f, media servers 126a-126n or other devices. Such a conversation may be carried out by sending packets back and forth along one or more links (e.g., 112a-112f, 114a-114n, 116, 118, 120 etc.) connecting the two devices. Packets from several flows may travel over the same links. In general, there will be several flows operating on a given link at any point in time. The devices 104a-104n may send the data packets to a core network (e.g., the SGSN 106, RNC 108 and GGSN 110) of a cell provider using one or more wired links 114a-114n. In general, everything higher than the access device 104a-104n (e.g., the wired components) may be considered the "core network". In a particular network, there may be several more elements in between the access devices 104a-104n and the SGSN 106. Packets from one or more access devices 104a-104n eventually travel to the RNC 108, SGSN 106, GGSN 110 and packet data network 111. The data packets may be copied to the monitoring system 200 via a probe included in one or more of the links 114a-114n, 116, 118, and/or 120. While shown as link probes, packet data can also be copied to the monitoring system 200 directly from the RNC 108, SGSN 106 and GGSN 110.

The monitoring system 200 may be used by network service providers to identify analyze video traffic on the data distribution network 10 in conjunction with data supplied from databases 124 and other data optionally received via other nodes 126. In the example shown, the monitoring system 200 may observe any or all of the traffic for the links 114a-114n of the data distribution network. Monitoring system 200 will be described in greater detail in conjunction with FIGS. 2-10, including several optional functions and features.

Figure 2:
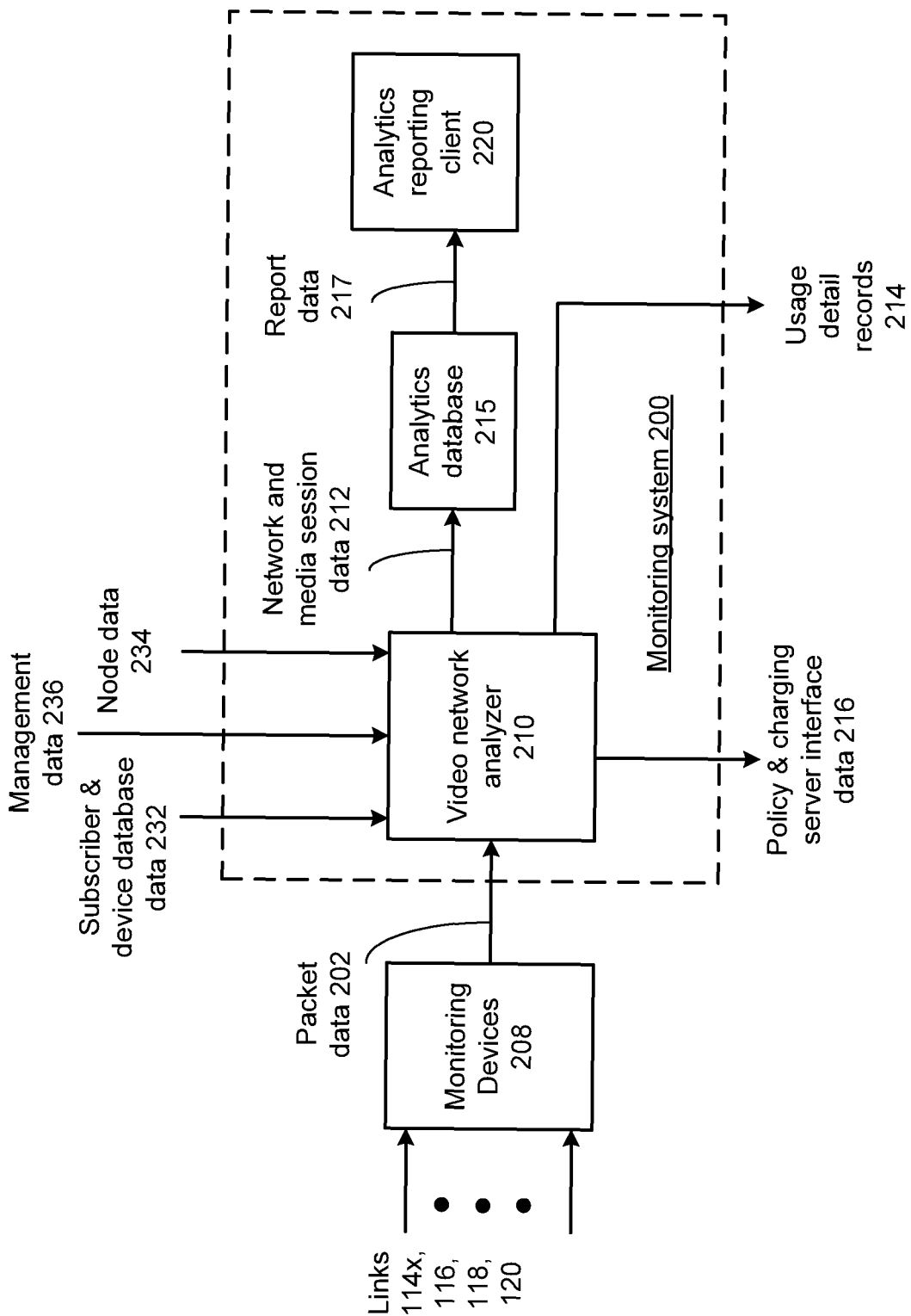
FIG. 2 presents a block diagram representation of a monitoring system 200 in accordance with an embodiment of the present invention.

FIG. 2 presents a block diagram representation of a monitoring system 200 in accordance with an embodiment of the present invention. In particular, a monitoring system 200 is shown that receives packet data 202 from one or more monitoring devices 208 coupled to one or more links 114a-114n, 116, 118, and/or 120 of the data distribution network 10. A video network analyzer 210 processes the packet data 202 to produce network and media session data 212 relating to the distribution of video content via the data distribution network in at least one media session and further to produce a plurality of usage detail records. The monitoring system 200 further includes an analytics database 215 that processes the network and media session data 212 to produce reporting data 217. The monitoring system 200 further includes an analytics reporting client 220 that processes the reporting data 217 for display to a user. The operation of monitoring system 200 including several optional functions and features can be described in conjunction with the following examples.

In an embodiment of the present invention, the monitoring devices 208 can be coupled to produce data via a passive tap that is used to split and replicate traffic directly from a network link such as link 114a-114n, 116, 118, 120, etc. This approach offers a non-intrusive method for replicating the packet data 202. The physical port on which traffic arrives can be configured as either upstream or downstream depending on the feed from the passive tap to indicate the direction of the data through the network link. In an alternative configuration, one or more of the monitoring devices 208 can be coupled to receive data via a port mirroring function of Ethernet switches or routers to replicate the packet data 202 from the network traffic. This approach has the advantage of being relatively simple to enable via configuration within existing deployed network elements within the backhaul and core network. In this approach, the subscriber and internet IP address masks can be specified in order for the network analyzer 210 to determine the direction of the traffic on each subnet.

One or more of the monitoring devices 208 can include a 1 Gb/s 1000BaseT interface module to interface with a wide range of either copper or optical links at a variety of different link data rates. Further, one or more of the monitoring devices 208 can be compatible with 802.11Q VLAN trunking. In operation, the corresponding monitoring device 208 can strip the VLAN headers access point names (APNs) and/or multi-protocol label switching (MPLS) labels from the frames to generate the packet data 202 for analysis by the video network analyzer 210. The video network analyzer 210 processes the various layers of one or more different protocol stacks to find the relevant mobile data related to media sessions, based on the particular format of the packet data 202 replicated from the network traffic. Examples of such layers and formats are provided in the table below:

| Layer | Formats |
| --- | --- |
| Container | FLV, MP4, MPEG-2 TS, MP3, ASF, etc. |
| Application Layer and Streaming Protocol | HTTP, RTMP, RTSP/RTP HTTP Live Streaming, Netflix, Silverlight |
| User L4 | TCP, UDP |
| User L3 | IPv4/v6 |
| Tunneling Protocol | GTPv1/2, GRE, |
| Network L4 | UDP |
| Network L3 | IPv4/v6 |
| Network L2 | Ethernet |

It should be noted that the table above merely provides examples of the many protocols and formats that can be implemented. In addition, a greater or a fewer number of layers can be analyzed, based on the particular protocol stacks employed in conjunction with data distribution network 10. In operation, the video network analyzer 210 processes the data to determine which video application layer protocol is being used and also parses the container layer to determine which video format is being delivered during a particular media session.

The data collected from the video network analyzer 210 can be extracted as network and media session data 212, transformed to fit operational needs and loaded into an analytics database 215. This network and media session data 212 data can include per-media session and per time-interval information. The analytics reporting client 220, with additional ad hoc processing by the analytics database 215, can provide geographic, time-based, and attribute-based views of the collected data through reporting data 217.

In an embodiment of the present invention, the monitoring system 200 is capable of de-capsulating and interpreting $3^{rd}$ Generation Partnership Project (3GPP) General Packet Radio Service (GPRS) Tunneling Protocol (GTP). This allows the monitoring system 200 to track session mobility as well as monitor the bearer speed and Quality of Service (QoS) the network is delivering. In particular, the video network analyzer 210 supports the 3GPP Gn and Gi interfaces as specified in 3GPP 29.060 v8.11.0. This includes both the control and user data traffic. It should be noted in this context that this version is a Rel-8 standard; however, it is backward compatible to all GPRS Tunneling Protocol versions of UMTS back to Rel-99 standards. In 3G Direct Tunnel deployments of the data distribution network 10, the SGSN 106 is removed from the data path. In this scenario the control plane traffic from user devices 102a-n are routed via the RNC 108 to the SGSN 106, while the user plane traffic is routed directly from the RNC 108 to the GGSN 110. The monitoring system 200 supports this deployment model as long as both the control and user traffic are intercepted and forwarded to the monitoring system 200 system. If the traffic is on separate physical links, two passive taps may be required. If there are multiple physical links, it is possible to use an aggregation switch and port minor the target traffic to the monitoring system 200 system.

In operation, the video network analyzer 210 receives data packets 202 from the monitoring device 208 and begins the de-capsulation process to further identify the data stream inside. In the case where monitoring system 200 is deployed within the wireless network, the first task is to identify which type of mobile network and mobility protocol is used. After packet format and structure have been identified the relevant mobility information is extracted from the protocol and stored with the detailed session information. This can include information such as the International Mobile Subscriber Identity (IMSI), Network Access Identifier (NAI), Mobile Station Integrated Services Digital Network (MSISDN) number, location information (cell sector id) and end-user IP address. If the packet needs to be reconstructed due to fragmentation, the packet is fully reassembled for further data processing. The data packet is then matched to any existing or known flows that monitoring system 200 is monitoring. If the flow is unknown, a new flow is created and managed. The flow is then subjected to deep analysis of the payload to determine if the data contains video information. The packet and flow are then associated to a new or existing media sessions. Media sessions can be made up of multiple flows depending on the type of streaming protocol or delivery method used.

Further processing is employed by video network analyzer 210 to identify the application protocol that is being used to deliver the video data. Once this is determined the protocol is parsed and the key video related information is decoded and analyzed and retrieved for processing and storage. The network and media session data 212 is updated accordingly. Once the packet has been fully processed it is dropped since forwarding the packet is not necessary in a passive monitoring deployment.

The network and media session data 212 includes at least one session metric such as a video Quality of Experience (QoE) score. There are fundamental differences between QoE and Quality of Service (QoS), which are briefly described. QoS is defined as a collection of performance characteristics (objective measures or Key Performance Indicators (KPIs)), that may or may not be related to a particular service. Specifically, QoS refers to a delivery mechanism which is usually multi-service in nature; therefore, the impact of network delivery on the actual application traffic is independent from the network transport characteristics. QoE is how a user perceives the usability of an application or service when in use. Since QoE is dependent on human perception and judgment, it can only be quantified via human measurement. Based on these measurements, models can be developed which approximate the subjective QoE score.

For video application and services, a video QoE is a measure of the subscriber's overall satisfaction when downloading and watching video content. Specific video details such as stalling during playback, the quality of each frame and the frame rate contribute to video QoE. If several packets are retransmitted (in the reliable transport case, e.g. using TCP) or lost (in the unreliable transport case, e.g. using UDP) during transfer the raw packet latency or loss rate (or absolute value) is not helpful in understanding the impact to the subscriber. What is required is knowledge of which packets were retransmitted or lost and how that affected the playback of the video.

It can be challenging to quantify a qualitative characteristic because perception is individualistic and generally conveyed only as an opinion based on shared comparisons. For voice communications, service providers try to form a consensus using a Mean Opinion Score (MOS) which offers a numerical representation of service quality. MOS scores developed for voice communications have become synonymous with QoE for voice calls. The mean scores are calculated by collecting feedback from subjects who listen to audio of varying quality and rate it. With this benchmark in place, MOS scores are commonly collected using software automation. MOS scores were originally developed to measure voice quality using a scale of 1 to 5. Life-like quality is rated as a 5, whereas service quality considered impossible to hear is rated as a 1. 3.5 (somewhere between annoying and fair quality) is considered the quality baseline, while scores below this mark are considered unacceptable. While originally designed for voice services, MOS score principles can also be used to measure service quality for new media services such as video and VoIP.

Video QoE is based on a similar principle of quantifying the QoE to produce a normalized rating for a media session. In an embodiment of the present invention, a zero-reference is employed to determine video QoE for IP-based video communications. Subjective experiments can be conducted to score a range of video streams/devices under a variety of conditions. The results can then be correlated to a model which predicts viewer satisfaction with a particular media session at every point during playback. The video network analyzer 210 quantifies video QoE in three distinct domains of (a) delivery QoE, (b) presentation QoE, and (c) overall or combined QoE. Network analyzer 210 processes packet data 202 to generate network and media session data 212 in the form delivery QoE, presentation QoE, and combined QoE corresponding to a particular media session.

Video network analyzer 210 measures the media delivery protocol directly in the network and extracts the key video information needed to understand what the application is requesting from the network. The Delivery QoE is a measure of how well the network is meeting that need. This calculation may include attributes such as resolution, bitrate, codec, frame rate as well as timing information, such as when the client is requesting the information, how the server is responding to those requests, and how fast the network transmits the media data. The Delivery QoE score expresses how the perceived quality is impacted by the network performance. For example a session that consists of a low quality video streamed over a perfect network would receive a perfect Delivery QoE score. The same low quality video streamed over a poor network would receive a poor Delivery QoE score. Further details regarding the determination of Delivery QoE are presented in conjunction with the copending U.S. patent application Ser. No. 13/053,650, entitled DELIVERY QUALITY OF EXPERIENCE (QoE) IN A COMPUTER NETWORK, and filed on Mar. 22, 2011, the contents of which are incorporated herein by reference thereto.

Presentation QoE is a measure of the quality of the media source with respect to the display device, combining both audio and video components, and excludes impairments due to delivery. The Presentation QoE score isolates the perceived quality of the source content and is independent of network delivery issues. As device capabilities including e.g. display size and processing performance increase so do customer expectations. The Presentation QoE algorithm produces a MOS score that gives a relative measurement of the source content quality to the device display capabilities. For example a clip that consists of a low resolution, poorly encoded video and audio would have low Presentation QoE when delivered to a smartphone. The same clip would have an even lower Presentation QoE when delivered to a laptop or PC. Another example is a clip that consists of a high resolution, well-encoded video but poorly encoded audio. In such an example the Presentation QoE would also be low.

A combined QoE score is an overall measure of the quality of experience for the media session due to the combined effects of Delivery and Presentation. It is a combination of the Delivery QoE and Presentation QoE scores.

In addition, network analyzer 210 can process packet data 202 to generate network and media session data 212 in the form of ad probability corresponding to a particular media session. Ad probability can be calculated in several different ways, based on [attributes] such as container or streaming protocol, clip duration, audio and video encoding parameters such as codecs, frame rates and resolution, as well as certain keywords within the URL, and can be represented on a numerical scale or as low, medium and high, or other indicators of ad probability. Every identified media session is inspected to determine the ad probability. Different types of ads including banners ads, pre-roll, interstitial, and post-roll ads can be detected.

In addition, network analyzer 210 can process packet data 202 to generate network and media session data 212 in the form of a network quality score corresponding to a particular media session. The network quality associated with a video session can be generated based on video bitrate and network bandwidth, packet arrival or other video and network metrics. Any of the metrics described above can be used to generate network and media session data 212 in the form of a network quality score from 0 to 100, low, medium and high, or other indicators of video and network quality.

Further, network analyzer 210 can process packet data 202 to generate network and media session data 212 to include protocol identification data, video parameter data (sampling and encoding), and/or audio parameter data (sampling and encoding). In particular, these kinds of network and media session data can identify the particular streaming protocols, transport protocols and media containers used in a particular media session, and indicators of the audio and video codecs employed, audio and video codec profiles, video resolution, video frame rate, the number of audio channels, audio sampling rate and optionally other audio and video parameters.

Also, network analyzer 210 can process packet data 202 to generate network and media session data 212 to include other data such as media site identification data that identifies a media site supplying the video content in the media session. Network and media session data 212 can include information pertaining to a user device 102a-102f that receives the video content in the media session, such as a device category and/or a device operating system of the user device, derived for example from the user agent field in the HTTP protocol, or from a subscriber data base that identifies the device and/or from a correlation of a device model with particular device characteristics from a device database. Network and media session data 212 can include other information pertaining the media session such as total clip duration as authored, and both streamed and viewed duration of the particular clip for the specific session. Network and media session data 212 can also include location information pertaining to the user device 102a-102f. Such location information can be gathered, for example, based on cell location identifiers for the particular access devices 104a-104n servicing the user device 102a-102f, or based on other information received from the data distribution network 10 or gathered from the packet data 202 originating from the user device 102a-102f itself.

The table below presents examples of network and media session data 212 in accordance with an embodiment of the present invention.

| CATEGORY | SUBCATEGORY | EXAMPLE |
| --- | --- | --- |
| MAIN | Media Site | youtube.com, netflix.com, hulu.com etc . . . (Media site can be edited/personalized) |
| | Location | Network dependant, e.g. cell site |
| | Device Category | Unknown, PC, Smartphone, Tablet |
| | Subscriber ID | IMSI |
| | equipmentId | IMEI |
| | phoneNumber | MSISDN |
| | Address | Source and destination IP addresses |
| | Time | Session start and end time, time zone |
| | Device Operating System | Windows, Windows Mobile, Symbian, Mac OS X, Apple iOS, Java ME, Linux, Android, webOS, Blackberry, Unknown |
| | Clip Duration | duration in seconds |
| | Streamed Duration | duration in seconds |
| SESSION METRICS | Delivery QoE | 0-5 (Unknown, Bad, Poor, Fair, Good, Excellent) |
| | Presentation QoE | 0-5 (Unknown, Bad, Poor, Fair, Good, Excellent) |
| | Ad Probability | Percentage, 0-100 |
| | Congested | Binary, if session was delivered during congested period or not |
| | Packet counts | Delivered and retransmitted or lost packets |
| | Byte counts | Delivered and retransmitted or lost bytes |
| | Network Quality | percentage, 0-100 |
| AUDIO | Audio Codec | AAC, ALAC, AMR, MP3, MPA, WMA, WMA2, WMAP, Ogg Vorbis, QCELP, PCM, GSM, Nelly Moser, Speex, MPEG, Not Present, Unknown |
| | Audio Codec Profile | AAC Main, AAC LC, AAC SSR, AAC LTP, AAC HE, Not Present, Unknown |
| | Audio Channels | Unknown, Mono, Stereo, Multi-channel |
| | Audio Sampling Rate | Unknown, 0 11025 Hz, 11025-22050 Hz, 22050-44100 Hz, 44100+ Hz |
| VIDEO | Video Codec | H.261, H.263, H.264, MPEG-1, MPEG-2, MPEG-4, Sorenson Spark, Sorenson Video, VC1, On2 VP3, On2 VP6, VP8, WMV, Not Present, Unknown |
| | Video Codec Profile | H.264 Baseline, H.264 Main, H.264 Extended, H.264 High, H.264 Scalable Baseline, H.264 Scalable Main, VC1 Simple, VC1 Main, VC1 Advanced, MPEG-4 Simple, MPEG-4 Advanced Simple, Not Present, Unknown |
| | Video Resolution | Unknown, 0-240 lines, 240-480 lines, 480-720 lines, 720+ lines |
| | Video Framerate | Unknown, 0-12 fps, 12-24 fps, 24+ fps |

| CATEGORY | SUBCATEGORY | EXAMPLE |
|---|---|---|
| PROTOCOL | Streaming Protocol | Flash RTMP, HTTP Download, RTSP, Silverlight Smooth Streaming, Silverlight Streaming, iPhone Transport Stream, Icecast Audio Streaming, Move Networks, Unknown |
| | Streaming Protocol Detail | Flash RTMP, Flash RTMPE - all, Progressive Download, Partial Progressive Download, Chunked Progressive Download, RTSP RTP UDP, RTSP RTP TCP, RTSP Interleaved, Silverlight Smooth Streaming - all, Silverlight Streaming - all, Icecast Audio Streaming - all, Move Networks - all |
| | Transport Protocol | TCP, UDP, Other |
| | Media Container | FLV, MP4, ASF, WebM, Unknown |

In addition to collecting and correlating network and media session data 212 for a particular media session, the analytic reporting client 220 can aggregate data over a plurality of media sessions to permit in-depth analysis of the network and media session data 212. In addition, the analytics reporting client 220 includes a graphical user interface (GUI) that allows system users such as service providers to interactively query the video session data available in the video network analyzer 210. In an embodiment of the present invention, the analytics reporting client 220 is a lightweight, browser-based client implemented using Flash technology to support the interactive, ad hoc querying of the data produced by video network analyzer 210. In addition to the ability to analyze data in real time, the client permits users to compare, print, save and export the reports they create. Reports can be exported in PDF format for inclusion into other reports or presentations. Users can automate the execution of scheduled reports, including the duration and frequency of reporting schedule. Users can create and customize templates to be used in the reporting process so that a common look and feel can be applied across all reports.

In particular, the analytics reporting client 220 allows user to generate reports based on any of the network and media session data 212 described above, either for a single media session or aggregated over multiple media sessions. In addition, filtering is available at the sub-category and attribute levels. For example, a user can generate a report examining specified media sites visited (e.g., youtube.com, googlevideo.com and hulu.com) over a given period of time (e.g., one week). Reports can be generated based on a set of configuration settings that determine the appearance and content of the report. Filters can be specified to include or exclude certain attributes from the report.

Video network analyzer 210 optionally exports some or all of the network and media session data 212 as a structured format Usage Detail Records 214 (UDRs). This allows the key mobile video data session information to be captured and exported for mediation and settlement in the mobile service provider's OSS and BSS systems. In an embodiment of the present invention, the video network analyzer 210 follows the Internet Protocol Detail Record (IPDR) standard for the production of Extensible Markup Language (XML) encoded UDRs 214. The UDRs 214 are stored locally and are collected via file transfer protocol (FTP) by a mediation system for further processing. The following table details the information available per media session via the UDRs:

| Field Name | Description |
|---|---|
| IPDRCreationTime | Time when the IPDR record was created |
| seqNum | IPDR sequence number |
| subscriberId | IMSI, |
| sourceAddress | Source IP address of the media session |
| destAddress | Destination IP address of the media session |
| startTime | The start time of the media session |
| endTime | The end time of the media session |
| mediaSessionId | Unique media session identifier |
| mediaSite | The media site URL |
| equipmentId | IMEI |
| phoneNumber | MSISDN |
| deviceCategory | Examples: PC, Smartphone, Tablet etc. |
| deviceOS | Examples: Windows, Mac OSX, Linux, iOS, Android, Blackberry, Symbian, webOS etc. |
| terminationReason | The reason for the media session termination |
| streamedDuration | The amount of time that media traffic was actually sent over the network |
| packets | The number of packets associated with the media session |
| bytes | The number of bytes associated with the media session |
| retransmitPackets | The number of retransmitted packets during with the media session |
| retransmitBytes | The number of retransmitted bytes during with the media session |
| mediaDelay | The delay in mS before the media is sent from the server |
| adProbability | The probability of the media session being an advertisement high/low |
| containerType | The container used in the media session |
| streamingProtocolCategory | High level categorization of the streaming protocol used to deliver the media session |

-continued

| Field Name | Description |
| --- | --- |
| streamingProtocol | Streaming protocol details used for the media session |
| transportProtocol | The transport used to deliver the media session (TCP/UDP) |
| videoCodecProfile | The video codec profile used to deliver the media session |
| videoCodec | The video codec used to deliver the media session |
| videoWidth | The width of the video in pixels |
| videoHeight | The height of the video in pixels |
| frameRate | The video frame rate of the media session |
| audioCodecProfile | The audio codec profile used for the media session |
| audioCodec | The audio codec used for the media session |
| audioChannels | The number of channels of audio, mono/stereo/multi-channel |
| audioSamplingRate | The sampling rate of the audio data |
| deliveryQoe | The delivery QoE score of the media session (1-5) |
| presentationQoe | The presentation QoE score of the media session (1-5) |
| networkQuality | The relative quality score rating for the network delivery during the media transfer |
| timeZoneOffset | Timezone offset from UTC |
| locationId | Identifier indicating location |

Also, video network analyzer 210 optionally exports some or all of the network and media session data 212 in real-time via locally generated policy and charging server interface data 216 messages. This allows both manual and automated application-based (video) policy and charging rules and decisions to be applied in the network, e.g.

- Admission control with service notifications to subscribers when media sessions or network areas are congested or experience poor QoE;
- video-optimized service plans which, e.g. zero-rate certain types of video content or media sessions experiencing congestion or poor QoE;
- Device-based plans where policies can be based on the device type (iPhone/iPad/iOS, Android. Blackberry) policy or category (smartphone/tablet/PC);
- Peak/offpeak or Time of Day (ToD) usage period definition for when policies can be used to proactively limit or control usage via video-specific capabilities such as transcoding in the busy hours; and
- Other application-based policy and charging rules and decisions.

In an embodiment of the present invention, the video network analyzer 210 uses the Diameter protocol over an existing Gx interface as well as a video-enhanced Gx+ interface to communicate with a policy and charging rules function (PCRF) node and the Diameter protocol over an existing Gy interface for communication with online charging system node.

Figure 3:
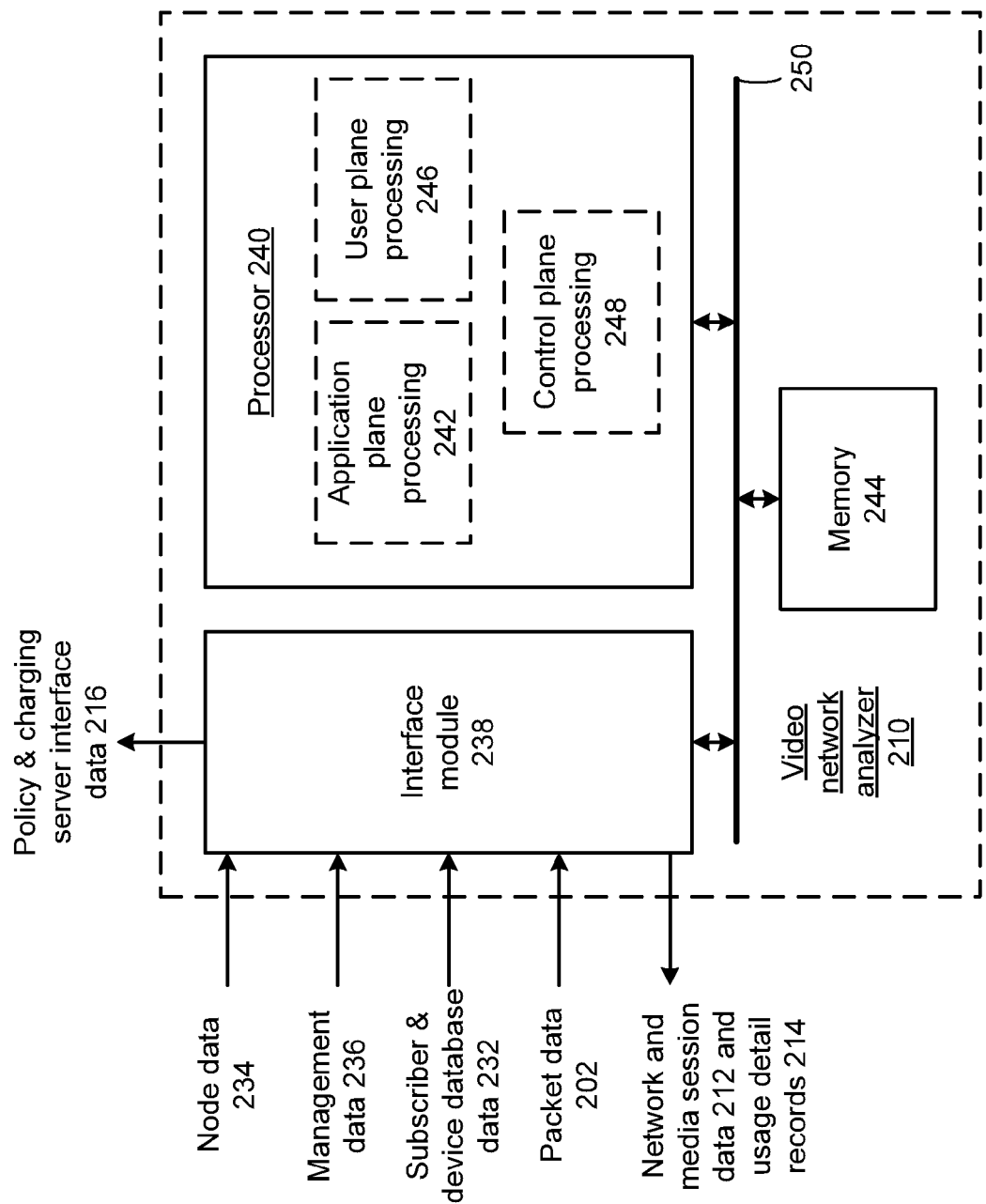
FIG. 3 presents a block diagram representation of a video network analyzer 210 in accordance with a further embodiment of the present invention.

FIG. 3 presents a block diagram representation of a video network analyzer 210 in accordance with a further embodiment of the present invention. In particular, video network analyzer 210 includes in interface module 238, processor 240 and memory 244 that are coupled via bus 249. While a particular bus architecture is shown, alternative architectures using direct connectivity between one or more modules and/or additional buses can likewise be implemented in accordance with the present invention. Further, video network analyzer 210 can include one or more additional modules that are not specifically shown.

Memory 244 optionally stores an operating system such as a Linux, Mac OS, MS Windows, Solaris or other operating system and one or more software modules to be executed by the processor 240 including program files, system data, buffers, drivers, utilities and other system programs. In addition, the memory 244 provides storage for the incoming packet data and the stored network and media session data 212 and UDRs 214 and optionally other data. Memory 244 may be a single memory device or a plurality of memory devices. Such a memory device can include a storage area network, network attached storage, as well as one or more dedicated hard disk drives or other disk drives, a read-only memory, random access memory, volatile memory, non-volatile memory, static memory, dynamic memory, flash memory, cache memory, and/or any device that stores digital information.

The processor 240 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory 244. Note that when the processor 240 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In an embodiment of the present invention, the processor 240 executes packet processing software via application blades within a carrier grade computing platform. The platform is a rack-mountable multi-slotted chassis supporting application blades with high speed interconnect between blades and external network connectivity. Examples of packet processing sub-tasks include

- Link layer: decapsulation, (GTP, VLAN tag removal, MPLS label stripping)
- Internet layer: IP defragmentation, and load balancing
- Transport layer: TCP reordering and analysis
- Application layer: HTTP and other streaming protocol parsing, media session identification and relation
- Media Layer: container parsing, media stream extraction, and session models The processor 240 also supports the tasks of UDR record generation and transmission by collating the network and media session data 212 stored in internal message queues and sending to an operational support system/business support system (OSS/BSS). It also supports the task of real-time communications using Diameter commands over Gx/Gy interfaces by collating the network and media session data 212 stored in internal message queues and sending to policy and/or charging servers. It also supports the task of managing the platform through a command line interface (CLI), and associated sub-tasks such as system monitoring, statistics collection, status reporting including alarming, and system configuration. The CLI runs via management interface data 236 shared over a management interface of interface module 238.

The memory 244 stores a single instance of the payload of packet data 202 with no further copying. The various protocol stack layers operate on the same piece of data by pointing to the appropriate layer offset within the packet in a non-blocking manner. Data can be discarded, and memory released, when it is no longer referenced by any protocol stack layer. This improves packet processing performance. The memory also provides for persistent storage and retrieval of network and media session data 212.

Interface module 238 includes one or more interfaces to other devices that communicate with the monitoring devices 208, databases 124 and other nodes 126: such as direct connectivity to access devices 104a-104n, RNC 108, SGSN 106, GGSN 110 or other nodes of data distribution network 10, via another network connections, to an operational support system/business support system (OSS/BSS) as well as to policy and charging servers associated with the data distribution network 10 or other network node. These interfaces can include can include a universal serial bus (USB) interface, an Ethernet interface, Firewire (IEEE 1394) interface, small computer system interface (SCSI), a Fibre Channel interface, or other interface, either standard or proprietary.

While not specifically shown, the monitoring system 200 can include either an internal or external load balancer to distribute traffic flows to the video network analyzer 210. Where processor 240 includes several independent processors, such as a plurality of application delivery blades, the subscriber traffic corresponding to a particular traffic flow should be consistently forwarded to the same processor for efficient processing.

As shown processor 240 implements application plane processing 242, user plane processing 246 and control plane processing 248 to collect and analyze different levels of the data from the protocol stack of the incoming packet data 202. These three processing planes can be implemented via separate software modules via a single processor or via multiple processors. In particular user plane data can include user data that is extracted from straight IP or tunneled data formatted, for example in accordance with GRE, GTPv1/v2, or other protocols of interest depending, on the type of network, and the type of interface as set forth in the table below.

| Network | Interface | Protocol |
| --- | --- | --- |
| UMTS | Gn | GTP (tunneled) |
| UMTS | Gi | IP |
| LTE | S1-u | GTP (tunneled) |
| WiMax | R6 | GRE (tunneled) |
| CDMA | A10 | GRE (tunneled) |

Control plane data includes in-band network signaling information and other network control data that can be analyzed by processor 240 to produce information that includes location and device type/IMSI, etc. that is formatted for example on the type of network, and the type of interface as set forth in the table below.

| Network | Interface | Protocol |
| --- | --- | --- |
| UMTS | Gn | GTP (tunneled) |
| LTE | S11 | GTP (tunneled) |
| WiMax | R6 | GRE (tunneled) |
| CDMA | A11 | GRE (tunneled) |

Application plane processing can include retrieval and analysis of subscriber and device database data 232 from one or more database in communication with video network analyzer 210 and further node data 234 received from other network nodes of the data distribution network 10. Examples include radio access network (RAN) feeds including signaling information from RAN equipment—e.g. access devices 104a-104n, RNC 108—and/or RAN probes at links 114a-114n, that can be used to generate information pertaining to user location, mobility updates, network congestion, etc. In addition, the application plane processing can be based on device database information obtained from a local copy or remote access to a device database such as Wireless Universal Resource File (WURFL), User Agent Profile (UAProf), Windows Management Instrumentation Device Driver Record (MWI DDR), or other device database. Further subscriber database information from databases such as the Home Location Register (HLR), Home Subscriber Server (HSS), Subscriber Profile Repository (SPR), Authorization and Accounting (AAA), Usage Data Collector (UDC), and UDR, can be used to access subscriber properties, client installed apps, etc.

In operation, the application plane processing 242 can generate network and media session data 212 and/or usage detail records 214 by processing the packet data 202, subscriber and device database data 232 and node data 234 in accordance with one or more models that estimate the condition of the network, the subscriber, the device and or the session itself. Such models include one or more device models, subscriber models, network models, congestion models, session models and/or other models that predict the state of the device, subscriber, the network or network congestion, and of the session based on the packet data 202, subscriber and device database data 232 and node data 234. Examples of such models include the flow models and link models used to generate congestion estimates in conjunction with the copending U.S. patent application Ser. No. 13/053,565, entitled CONGESTION ESTIMATION, and filed on Mar. 22, 2011, the contents of which are incorporated herein by reference thereto. A further example of such models includes the media session module, video buffer module and user module used to estimate quality of experience in the copending U.S. patent application Ser. No. 13/053,650 entitled DELIVERY QUALITY OF EXPERIENCE (QoE) IN A COMPUTER NETWORK, and filed on Mar. 22, 2011, the contents of which are incorporated herein by reference thereto.

The network and media session data 212 generated by processor 240 can include data that indicates static media clip properties such as content source site, ad probability, clip duration, streaming protocol/container, encryption information such as the particular container/codec, video codec/profile, video bit rate, video resolution, video frame rate, audio codec, audio bit rate, audio channels, and audio sampling rate, etc. The network and media session data 212 generated by processor 240 can also include data that indicates dynamic media session properties that are generated via application plane processing 242 based on one or more models. Examples of such dynamic media session properties include data indicating total transmitted bytes, total transmitted packets, retransmitted bytes, retransmitted packets, congestion by site and by sector, QoE by site and by sector, user location/cellId, streamed duration, played duration, media session QoE in terms of both delivery and presentation quality, maximum and average video buffer fullness, etc. The network and media session data 212 generated by processor 240 can include further data that indicates device properties such as device category, device operating system, screen size, as well subscriber properties such as subscriber tier, current usage, data plan and other subscriber and device information associated with the user device 102-102f involved with a media session.

Figure 4:
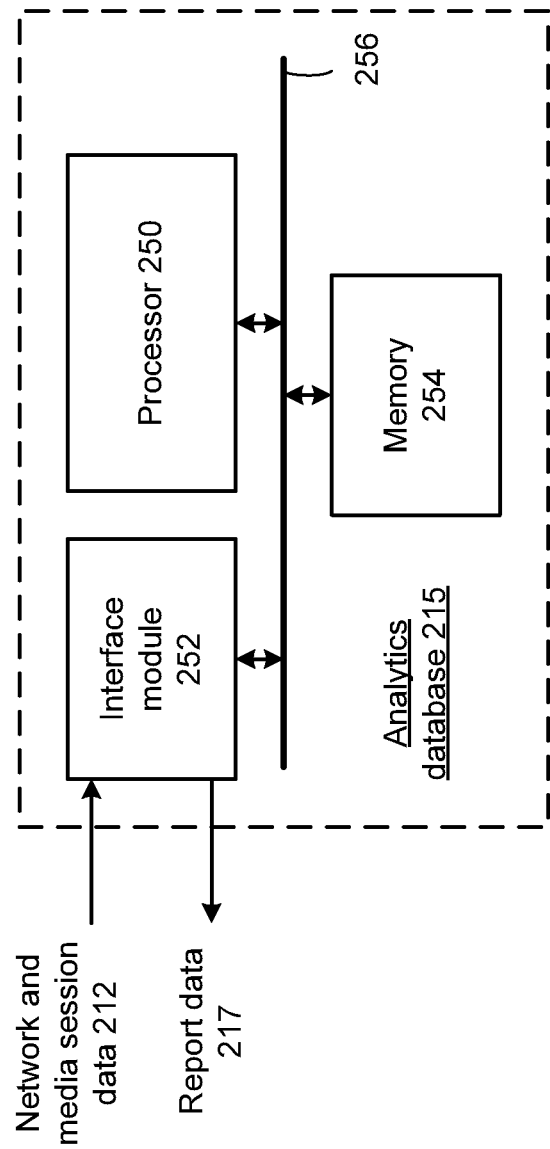
FIG. 4 presents a block diagram representation of an analytics database 215 in accordance with a further embodiment of the present invention.

FIG. 4 presents a block diagram representation of an analytics database 215 in accordance with a further embodiment of the present invention. In particular, analytics database 215 includes in interface module 252, processor 250 and memory 254 that are coupled via bus 256. While a particular bus architecture is shown, alternative architectures using direct connectivity between one or more modules and/or additional buses can likewise be implemented in accordance with the present invention. Further, video network analyzer 210 can include one or more additional modules that are not specifically shown.

Memory 254 optionally stores an operating system such as a Linux, Mac OS, MS Windows, Solaris or other operating system and one or more software modules to be executed by the processor 250 including program files, system data, buffers, drivers, utilities and other system programs. In addition, the memory 254 provides storage for the incoming network and media session data 212 and outgoing report data 217 and optionally other data. Memory module 254 may be a single memory device or a plurality of memory devices. Such a memory device can include a storage area network, network attached storage, as well as one or more dedicated hard disk drives or other disk drives, a read-only memory, random access memory, volatile memory, non-volatile memory, static memory, dynamic memory, flash memory, cache memory, and/or any device that stores digital information.

The processor 250 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory 254. Note that when the processor 250 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In an embodiment of the present invention, the processor 250 executes analytics software via Commercial Off The Shelf (COTS) servers and the memory 254 includes a centralized data storage cluster that provides long-term storage and retrieval of report data 217. It also supports the task of collating the data in accordance with requests from the analytic reporting client 220 to generate any specified preconfigured reports or report data 217. The memory 254 stores data in columns to improve query performance of analytic applications. This enables the analytics database 215 to sift through billions of media session records in seconds in response to ad hoc queries and analytic applications. To further aid with the large amount of storage the database requires, the memory 254 supports aggressive data compression allowing for more views and requiring less physical storage. This reduces the cost and complexity of the necessary storage platforms.

The memory 254 also supports an advanced clustered architecture based on segmentation of data (shared nothing architecture). This allows for the database to be scaled horizontally by adding more nodes to the overall cluster to meet the performance and storage requirements of differing service providers. The memory 254 can include a number of features to ensure against data loss, such as data redundancy. Data redundancy will distribute data to multiple nodes within the cluster to ensure there is more than a single copy, protecting against the loss of a cluster member. During an outage period, the node that stores the redundant copies (referred to as the buddy node) is used to answer the query. For additional data loss prevention, memory 254 includes a built-in buffer with a nominal six hour lifetime. Six hours is a nominal value and may vary depending on service provider traffic models.

In accordance with the present invention, the report data 217 generated based on the network and media session data 212 can be used for such diverse purposes as service assurance in reducing churn and Service Level Agreement (SLA) reporting; in network planning for capacity planning, optimization planning; in service-mix planning, upselling, service differentiation; real-time input into policy and charging control and/or traffic management systems. In addition, network and media session data 212 and/or usage detail records 214 can be generated on a per media session basis for exported into a service provider OSS/BSS system or to a customer relationship management system (CRM) system for service assurance or to a charging gateway function (CGF) for billing purposes. In a similar fashion, network and media session data 212 and/or usage detail records 214 can be exported to third party analytics frameworks that are service provider owned, CDN owned, Ad-network owned or Content-provider owned for data warehousing. Further network and media session data 212 and/or usage detail records 214 can be exported to service architectures to optimize service delivery and/or to Policy and Charging control (PCC) architectures such as policy control reference point (PCRF) or an online charging system (OCS).

The present system includes many features including allowing the computation of QoE scores for individual media sessions. The present system further allows the aggregation of multiple/separate network layer flows into a "media session" possibly from multiple locations—e.g. as seen with seeking and pre-fetching; multiple flows at overlapping locations—e.g. as seen with adaptive streaming when switching quality levels; multiple flows from multiple servers—e.g. as seen with load balancing/CDNs. The video network analyzer 210 can normalize application-level QoE scoring for media traffic across all N media characteristics (e.g. devices—smartphones, laptops, etc—and streaming technologies—Real-time Transport Protocol (RTP), Hypertext Transport Protocol—Progressive Download (HTTP-PD), adaptive streaming, Real-time Messaging Protocol (RTMP), Encrypted Real-time Messaging Protocol (RTMPE), or other media traffic, etc). In addition, the video network analyzer 210 can compute the number and duration of re-buffering events for media sessions and further determine the location and details of stream switches for adaptive streaming media session.

The analytics reporting client 220 can retrieve report data 217 to cross-correlate any number of types of network and media session data 212. For example, the analytics reporting client 220 can track and report on: the number of media sessions at each QoE level by congestion level or by location, user device, operating system, by clip length, etc; the number of media sessions for each streaming protocol or video codec by media site; the number of media sessions at QoE level for ad media session; the number of media sessions at QoE level for source site/CDN, etc.

While the data distribution network 10 has been primarily described in conjunction with a Universal Mobile Telecommunications Service (UMTS), similar deployments may be implemented for other types of cellular networks (e.g., Code Division Multiple Access (CDMA), WiMAX, etc.).

Figure 5:
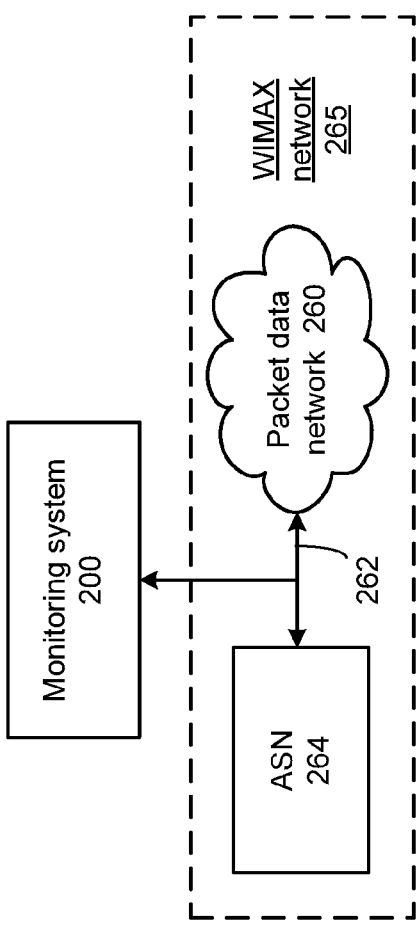
FIG. 5 presents a block diagram representation of a WIMAX network 265 in accordance with a further embodiment of the present invention.

FIG. 5 presents a block diagram representation of a WIMAX network 265 in accordance with a further embodiment of the present invention. In particular, monitoring system 200 is coupled to gather packet data 202 via link 262 between access service node 264 and packet data network 260, such as packet data network 111, the Internet or other wide area network. While not specifically shown, the monitoring system 200 can be coupled to other points along the network and to other nodes and databases to gather other data in a similar fashion to the techniques previously described.

Figure 6:
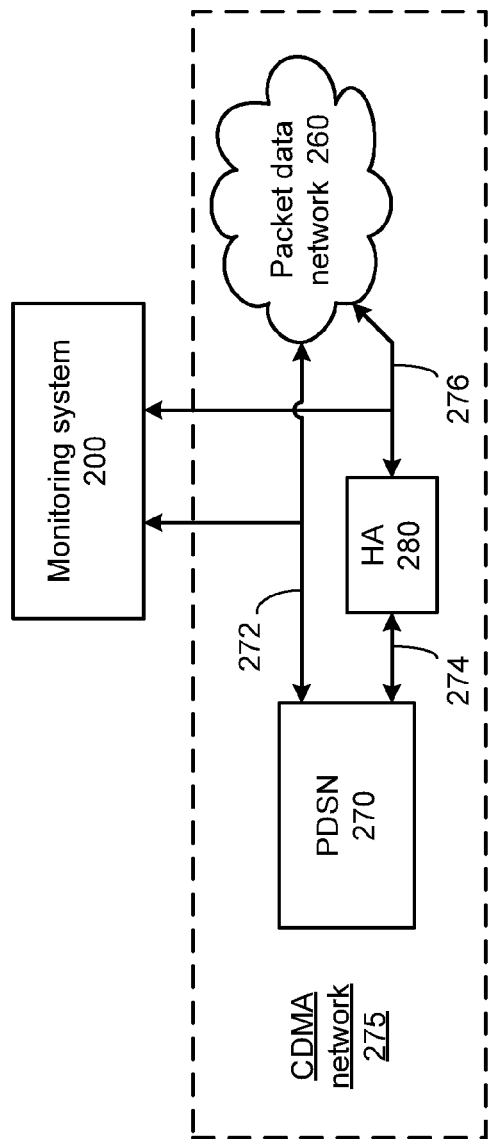
FIG. 6 presents a block diagram representation of a CDMA network 275 in accordance with a further embodiment of the present invention.

FIG. 6 presents a block diagram representation of a CDMA network 275 in accordance with a further embodiment of the present invention. In particular, monitoring system 200 is coupled to gather packet data 202, via link 274 between packet data serving node 270 and packet data network 260 and/or via link 276 between Home Agent (HA) 280 and packet data network 260. While not specifically shown, the monitoring system 200 can be coupled to other points along the network and to other nodes and databases to gather other data in a similar fashion to the techniques previously described.

Figure 7:
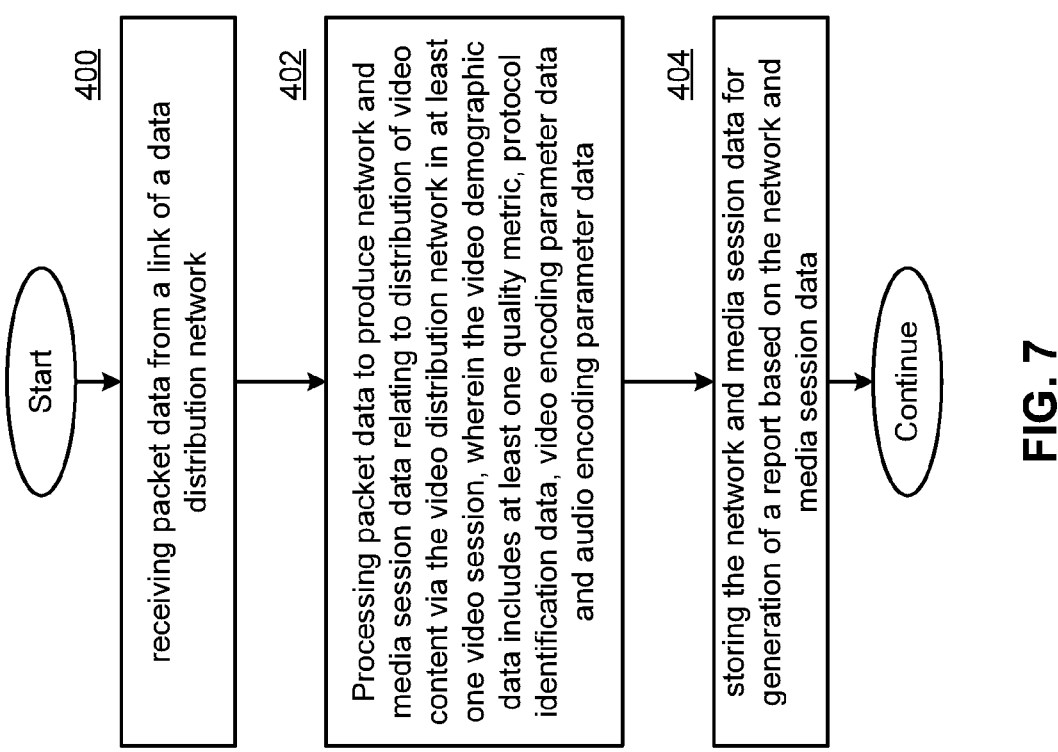
FIG. 7 presents a flowchart representation of a method in accordance with an embodiment of the present invention.

FIG. 7 presents a flowchart representation of a method in accordance with an embodiment of the present invention. In particular, a method is presented for use in conjunction with one or more functions and features described in conjunction FIGS. 1-6. In step 400, packet data is received from a link of a data distribution network. In step 402, the packet data is processed to generate network and media session data relating to the distribution of video content via the data distribution network in at least one media session, wherein the network and media session data includes a session metric, protocol identification data, video parameter data, and audio parameter data, more specifically, the data described in media session data 212 and usage detail records 214. In step 404, the network and media session data is stored for generation of report data based on the network and media session data.

In an embodiment of the present invention, the network and media session data further includes a media site identification data that identifies a media site supplying the video content in the at least one media session. The network and media session data can further include at least one of the following information pertaining the at least one media session: a first duration of the video content; and a second duration of the at least one media session. The session metric can include an advertising probability indicator. The link can operate in accordance with an internet protocol. The packet data can be processed to de-capsulating a tunneling protocol from the link of the data distribution network. The report data can be aggregated over a plurality of media sessions.

Figure 8:
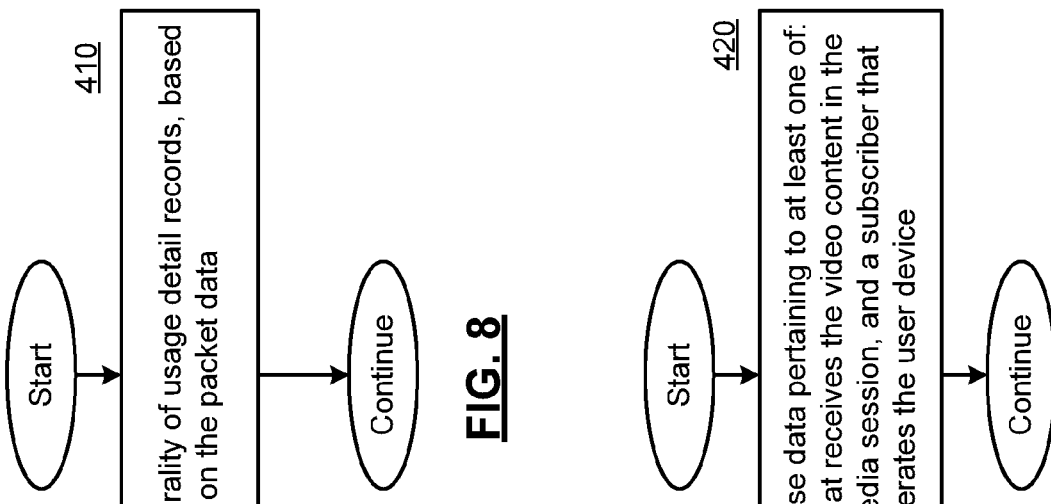
FIG. 8 presents a flowchart representation of a method in accordance with an embodiment of the present invention.

FIG. 8 presents a flowchart representation of a method in accordance with an embodiment of the present invention. In particular, a method is presented for use in conjunction with one or more functions and features described in conjunction FIGS. 1-7.

In step 410, a plurality of usage detail records are generated, based on the packet data, wherein the usage detail records are formatted for export directly to a service provider support system.

Figure 9:
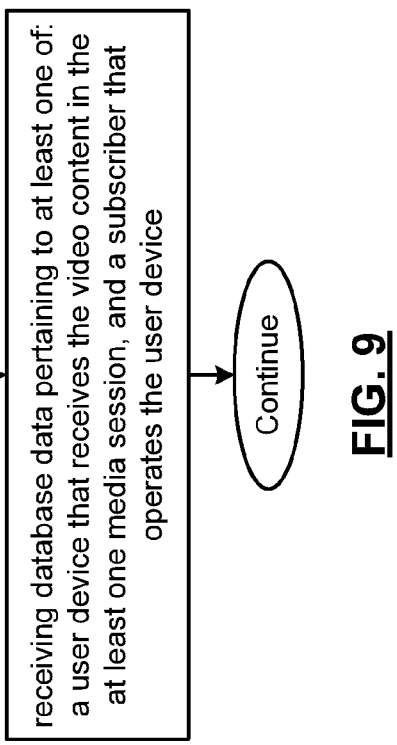
FIG. 9 presents a flowchart representation of a method in accordance with an embodiment of the present invention.

FIG. 9 presents a flowchart representation of a method in accordance with an embodiment of the present invention. In particular, a method is presented for use in conjunction with one or more functions and features described in conjunction FIGS. 1-8. In step 420, database data is received pertaining to at least one of: a user device that receives the video content in the at least one media session, and a subscriber that operates the user device Processing the packet data to generate the network and media session data can further be based on the database data and the network and media session data can further include a data plan corresponding to the subscriber, a device category of the user device and/or a device operating system of the user device.

Figure 10:
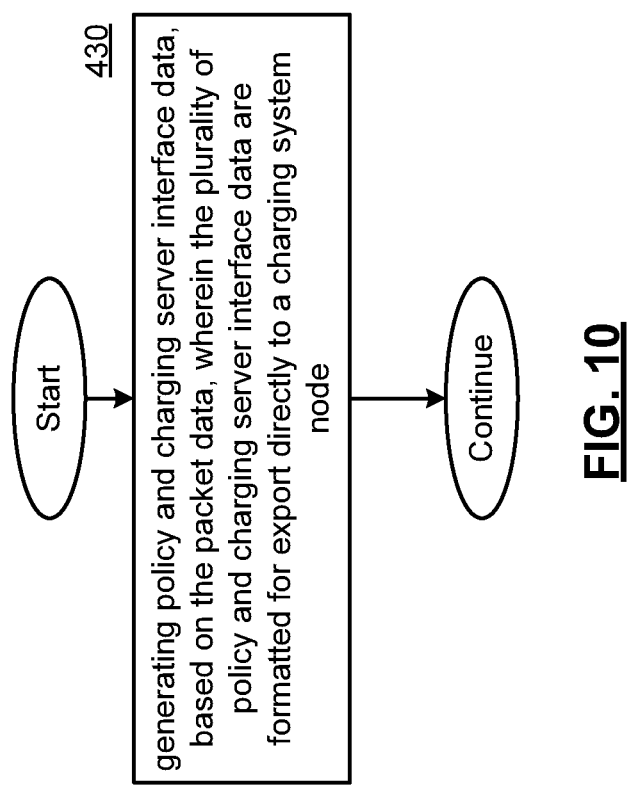
FIG. 10 presents a flowchart representation of a method in accordance with an embodiment of the present invention.

FIG. 10 presents a flowchart representation of a method in accordance with an embodiment of the present invention. In particular, a method is presented for use in conjunction with one or more functions and features described in conjunction FIGS. 1-9. In step 430, policy and charging server interface data are generated, based on the packet data, wherein the plurality of policy and charging server interface data are formatted for export directly to policy and/or charging system nodes.

While particular combinations of various functions and features of the present invention have been expressly described herein, other combinations of these features and functions are possible that are not limited by the particular examples disclosed herein are expressly incorporated within the scope of the present invention.

As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled".

As the term module is used in the description of the various embodiments of the present invention, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a data distribution network and a monitoring system for use therewith and with networks. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A monitoring system comprising:
a video network analyzer, coupled to a monitoring device, that processes packet data of a data distribution network to identify at least one media session in the packet data that includes video content, and to generate network and media session data relating to distribution of the video content via the data distribution network in the at least one media session to a remote video player, wherein the network and media session data includes a plurality of quality of experience metrics that predict the quality perceived by a user in association with presentation of the at least one media session to the user and wherein the video network analyzer generates a delivery quality of experience metric of the plurality of quality of experience metrics, at least in part, by analyzing the packet data from the at least the one media session prior to buffering by the remote video player, to predict a video stalling during playback and an associated re-buffering event wherein prediction comprises an estimated number of re-buffering events and their duration or their location in the media session and the video network analyzer also generates a presentation quality of experience metric of the plurality of quality of experience metrics, based in part on a relationship between an encoding quality and a display resolution associated with the remote video player; and an analytics database, coupled to the video network analyzer, that stores the network and media session data for generation of report data based on the network and media session data.

2. The monitoring system of claim 1 wherein the video network analyzer analyzes the packet data to produce a plurality of usage detail records that are formatted for export directly to a service provider support system.

3. The monitoring system of claim 1 wherein the video network analyzer analyzes the packet data to produce policy and charging server interface data, based on the packet data, wherein the policy and charging server interface data are formatted for export directly to at least one of: a policy system node and a charging system node.

4. The monitoring system of claim 1 wherein the network and media session data further includes a media site identification data that identifies a media site supplying the video content in at least one media session.

5. The monitoring system of claim 1 wherein the video network analyzer receives database data pertaining to at least one of:
a user device that receives the video content in the at least one media session, and a subscriber that operates the user device; wherein the video network analyzer generates the network and media session data based further on the database data; and
wherein the network and media session data further includes at least one of the following:
a first unique identifier corresponding to the subscriber; and
a second unique identifier corresponding to the user device; and
a device category of the user device; and
a device operating system of the user device.

6. The monitoring system of claim 1 wherein the network and media session data further includes at least one of:
a clip length data that identifies a duration in time or size in bytes of media content as stored on a server; and
a streamed length data that identifies a duration in time or size in bytes of media content that was streamed during the at least one media session; and
a watched length data that identifies a duration in time or size in bytes of media content that was viewed during the at least one media session; and
buffer fullness data that identifies an amount of media content stored in a media player of a user device, in the at least one media session.

7. The monitoring system of claim 1 wherein the at least one session metric includes an advertising probability indicator that indicates a numerical probability that at least one media session contains an advertisement.

8. The monitoring system of claim 1 wherein the video network analyzer identifies and tracks the at least one media session over a plurality of network flows.

9. The monitoring system of claim 1 wherein the at least one media session includes a plurality of media sessions; and
wherein the report data is aggregated over the plurality of media sessions.

10. The monitoring system of claim 1 wherein the video network analyzer processes the packet data to de-capsulate a tunneling protocol from a link of the data distribution network.

11. A method comprising:
receiving packet data from a link of a data distribution network; and
processing the packet data to identify at least one media session in the packet data that includes video content, and to generate network and media session data relating to distribution of the video content via the data distribution network in the at least one media session to a remote video player, wherein the network and media session data includes a plurality of quality of experience metrics that predict the quality perceived by a user in association with presentation of the at least one media session to the user and wherein a delivery quality of experience metric of the plurality of quality of experience metrics is generated, at least in part, by analyzing the packet data from the at least the one media session prior to reception by the remote player, to predict states of the remote video player including a rebuffering event of the remote video player wherein prediction comprises an estimated number of rebuffering events and their duration or their location in the media session and a presentation quality of experience metric of the plurality of quality of experience metrics is generated, based in part on a relationship between an encoding quality and a display resolution associated with the remote video player; and
storing the network and media session data for generation of report data based on the network and media session data.

12. The method of claim 11 further comprising:
generating a plurality of usage detail records, based on the packet data, wherein the usage detail records are formatted for export directly to a service provider support system.

13. The method of claim 11 further comprising:
generating policy and charging server interface data, based on the packet data, wherein the policy and charging server interface data are formatted for export directly to a at least one of: a policy system node and a charging system node.

14. The method of claim 11 wherein the network and media session data further includes a media site identification data that identifies a media site supplying the video content in the at least one media session.

15. The method of claim 11 further comprising:
receiving database data pertaining to at least one of: a user device that receives the video content in the at least one media session, and a subscriber that operates the user device;
wherein processing the packet data to generate the network and media session data is further based further on the database data; and
wherein the network and media session data further includes at least one of the following:
a first unique identifier corresponding to the subscriber; and
a second unique identifier corresponding to the user device; and
a device category of the user device; and
a device operating system of the user device.

16. The method of claim 11 wherein the network and media session data further includes at least one of:
- a clip length data that identifies a duration in time or size in bytes of media content as stored on a server; and
- a streamed length data that identifies a duration in time or size in bytes of media content that was streamed during the at least one media session; and
- a watched length data that identifies a duration in time or size in bytes of media content that was viewed during the at least one media session;
- a minimum, maximum, and average buffer fullness data that identifies a respective duration in time or size in bytes of media content that was stored in a media player on a user device; and
- buffer fullness data that identifies an amount of media content stored in a media player of a user device, in the at least one media session.

17. The method of claim 11 wherein the at least one session metric includes an advertising probability indicator that indicates a numerical probability that at least one media session contains an advertisement.

18. The method of claim 11 wherein the link operates in accordance with an internet protocol.

19. The method of claim 11 wherein the at least one media session includes a plurality of media sessions; and
- wherein the report data is aggregated over the plurality of media sessions.

20. The method of claim 11 wherein processing the packet data includes de-capsulating a tunneling protocol from the link of the data distribution network.

* * * * *